United States Patent
Poole et al.

(10) Patent No.: US 12,406,321 B2
(45) Date of Patent: Sep. 2, 2025

(54) ELIMINATION CACHE

(71) Applicant: QUALCOMM Incorporated, San Diego, CA (US)

(72) Inventors: Nigel Poole, West Newton, MA (US); Zilin Ying, San Diego, CA (US); Xuhui Mao, San Diego, CA (US); Vijay Kumar Donthireddy, Bengaluru (IN); Srihari Babu Alla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/175,480

(22) Filed: Feb. 27, 2023

(65) Prior Publication Data
US 2024/0289912 A1 Aug. 29, 2024

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ......... G06T 1/20; G06T 1/60; G06F 12/0855; G06F 12/0808; G06F 12/0875; G06F 2212/45; G06F 2212/302; G06F 2212/455; G09G 5/363
USPC ................. 345/522, 557; 711/111, 143, 133
See application file for complete search history.

(56) References Cited

U.S. PATENT DOCUMENTS

| | | | |
|---|---|---|---|
| 7,817,154 B1 | 10/2010 | Sams et al. | |
| 7,948,498 B1* | 5/2011 | Minkin | G06T 1/60 345/557 |
| 2011/0084977 A1 | 4/2011 | Duluk, Jr. et al. | |
| 2012/0072470 A1* | 3/2012 | Joseph | G06F 16/24552 711/143 |
| 2013/0046922 A1 | 2/2013 | Pan et al. | |
| 2014/0281251 A1* | 9/2014 | Zhang | G06F 12/0826 711/133 |
| 2016/0041776 A1* | 2/2016 | Inoue | G06F 12/0811 711/114 |
| 2018/0121368 A1* | 5/2018 | Apodaca | G06F 12/126 |
| 2020/0151845 A1* | 5/2020 | Grajewski | G06F 12/0207 |
| 2020/0379767 A1* | 12/2020 | McCrary | G06F 9/3838 |
| 2021/0248094 A1* | 8/2021 | Norman | G06F 9/4403 |

OTHER PUBLICATIONS

International Search Report and Written Opinion—PCT/US2024/016125—ISA/EPO—Jun. 17, 2024.

* cited by examiner

*Primary Examiner* — Prabodh M Dharia
(74) *Attorney, Agent, or Firm* — Procopio, Cory, Hargreaves & Savitch

(57) ABSTRACT

A graphics processor may obtain an indication of at least one state update from at least one CP associated with a graphics processor, where the at least one state update corresponds to one or more states in a set of states associated with the graphics processor. The graphics processor may determine whether the one or more states are stored in a cache associated with the graphics processor. The graphics processor may discard the at least one state update based on a determination that the one or more states are stored in the cache or update the cache based on a determination that the one or more states are not stored in the cache.

30 Claims, 11 Drawing Sheets

ELIMINATION CACHE

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for graphics processing may not address redundant state updates in a command stream. There is a need for improved techniques pertaining to reducing redundant state updates in a graphics processor (e.g., a GPU).

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for graphics processing are provided. The apparatus includes a memory; and at least one processor coupled to the memory and, based at least in part on information stored in the memory, the at least one processor is configured to obtain an indication of at least one state update from at least one command processor (CP) associated with a graphics processor, where the at least one state update corresponds to one or more states in a set of states associated with the graphics processor; determine whether the one or more states are stored in a cache associated with the graphics processor; and discard the at least one state update based on the determination that the one or more states are stored in the cache or update the cache based on the determination that the one or more states are not stored in the cache.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
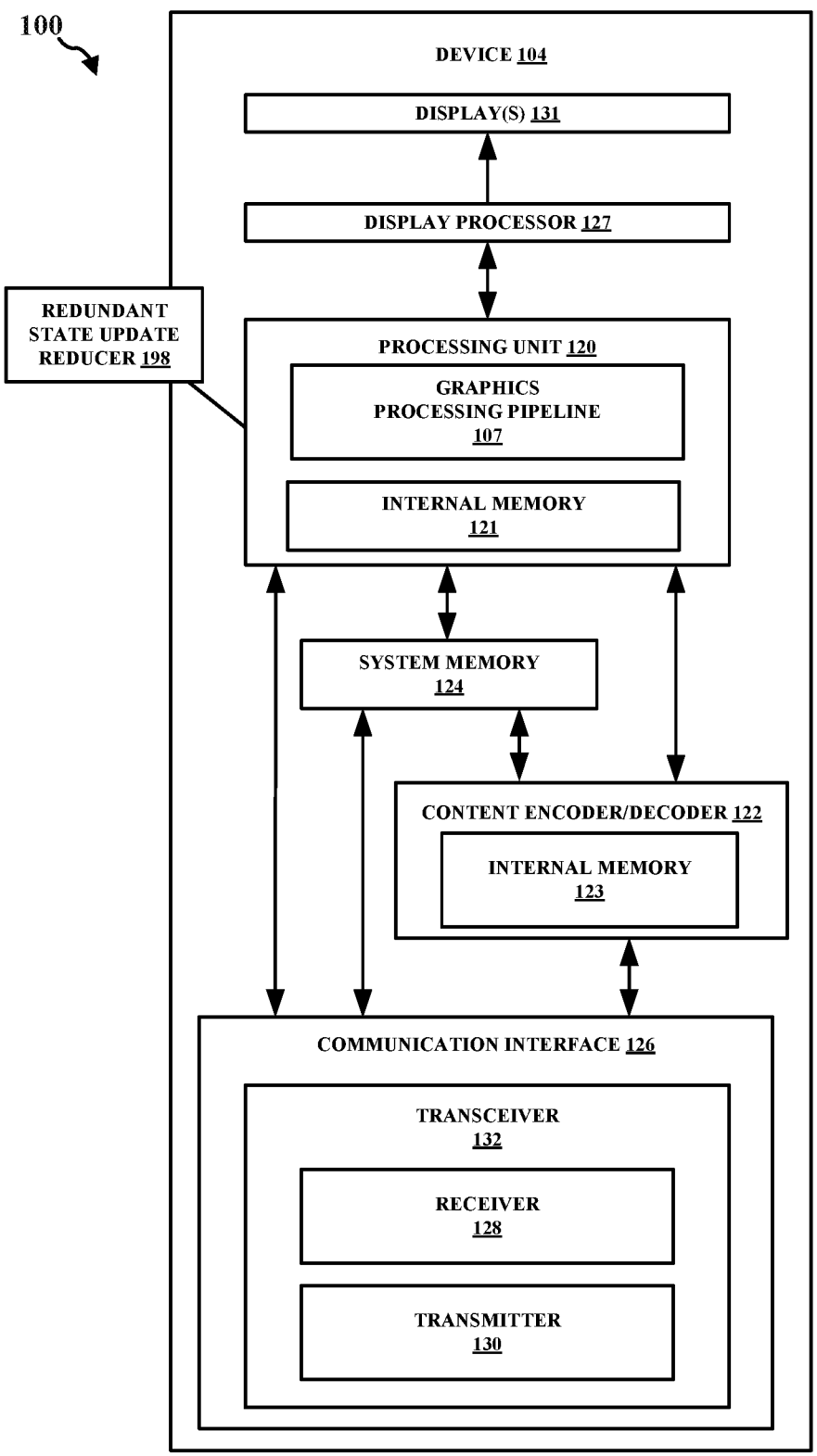
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A graphics processor (e.g., a GPU) may be driven by a software driver that generates driver-generated command streams that are used to prepare the graphics processor for upcoming draw commands. A command stream may include a state update, where the state update includes an address of a register in the graphics processor that is to be updated and new data that is to be stored in the register. The command stream may include a redundant state update, that is, the command stream may include a state (i.e., a programming state) that already exists in the graphics processor (e.g., in a register of the graphics processor). In one example, the redundant state update may be included in the command stream as a result of various data structures utilized by the software driver and/or as a result of associated handling of the various data structures. In another example, the redundant state update may be a draw command associated with a non-visible draw as determined by a command processor associated with the GPU, and as a result, the redundant state update may not be utilized to display graphical content, as non-visible draws may be dropped within a graphics pipeline. A redundant state update sent from a command processor of the graphics processor to other components of the graphics processor may result in an inefficient use of power and/or may result in extra programming time at the graphics processor. The extra programming time at the graphics processor may increase to a point as to become a dominant factor in draw throughput, which may limit performance of the graphics processor.

Various technologies pertaining to an elimination cache are described herein, where the elimination cache may reduce a number of redundant state updates in a graphics processor (e.g., a GPU). In an example, an apparatus (e.g., a graphics processor or a GPU) obtains an indication of at least one state update from at least one CP associated with a graphics processor, where the at least one state update corresponds to one or more states in a set of states associated with the graphics processor. The apparatus determines whether the one or more states are stored in a cache (e.g., an elimination cache) associated with the graphics processor. The apparatus discards the at least one state update based on the determination that the one or more states are stored in the cache or updates the cache based on the determination that the one or more states are not stored in the cache. Vis-à-vis discarding state update(s) if a corresponding state is stored in the cache (e.g., an elimination cache), the apparatus may reduce a number of redundant state updates that are propagated through a graphics processor pipeline, which may result in reduced power consumption, reduced programming time, and increased performance in comparison to graphics processors that do not include an elimination cache.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a redundant state update reducer 198 configured to obtain an indication of at least one state update from at least one CP associated with a graphics processor, where the at least one state update corresponds to one or more states in a set of states associated with the graphics processor; determine whether the one or more states are stored in a cache associated with the graphics processor; and discard the at least one state update based on the determination that the one or more states are stored in the cache or update the cache based on the determination that the one or more states are not stored in the cache. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
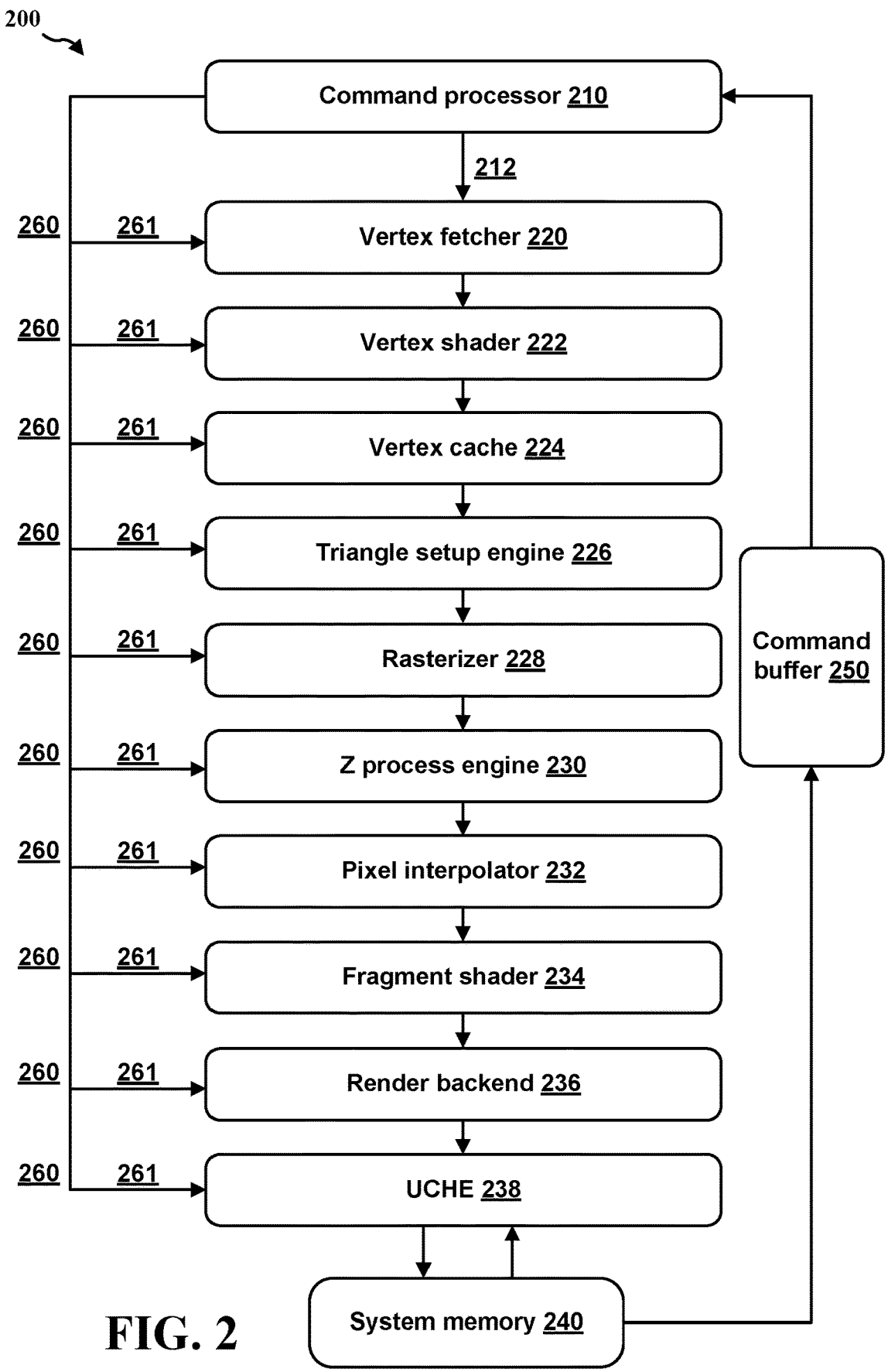
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
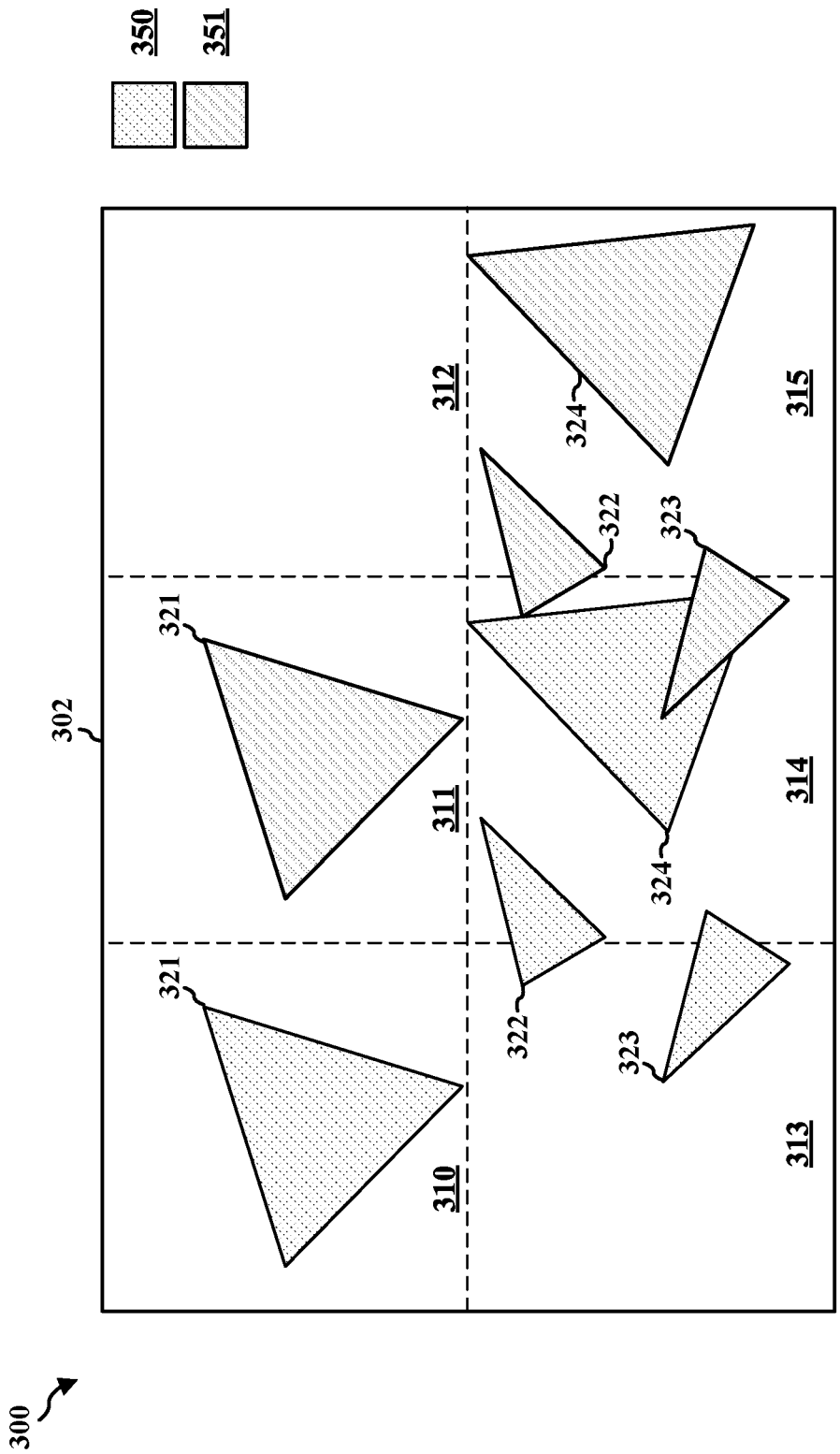
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
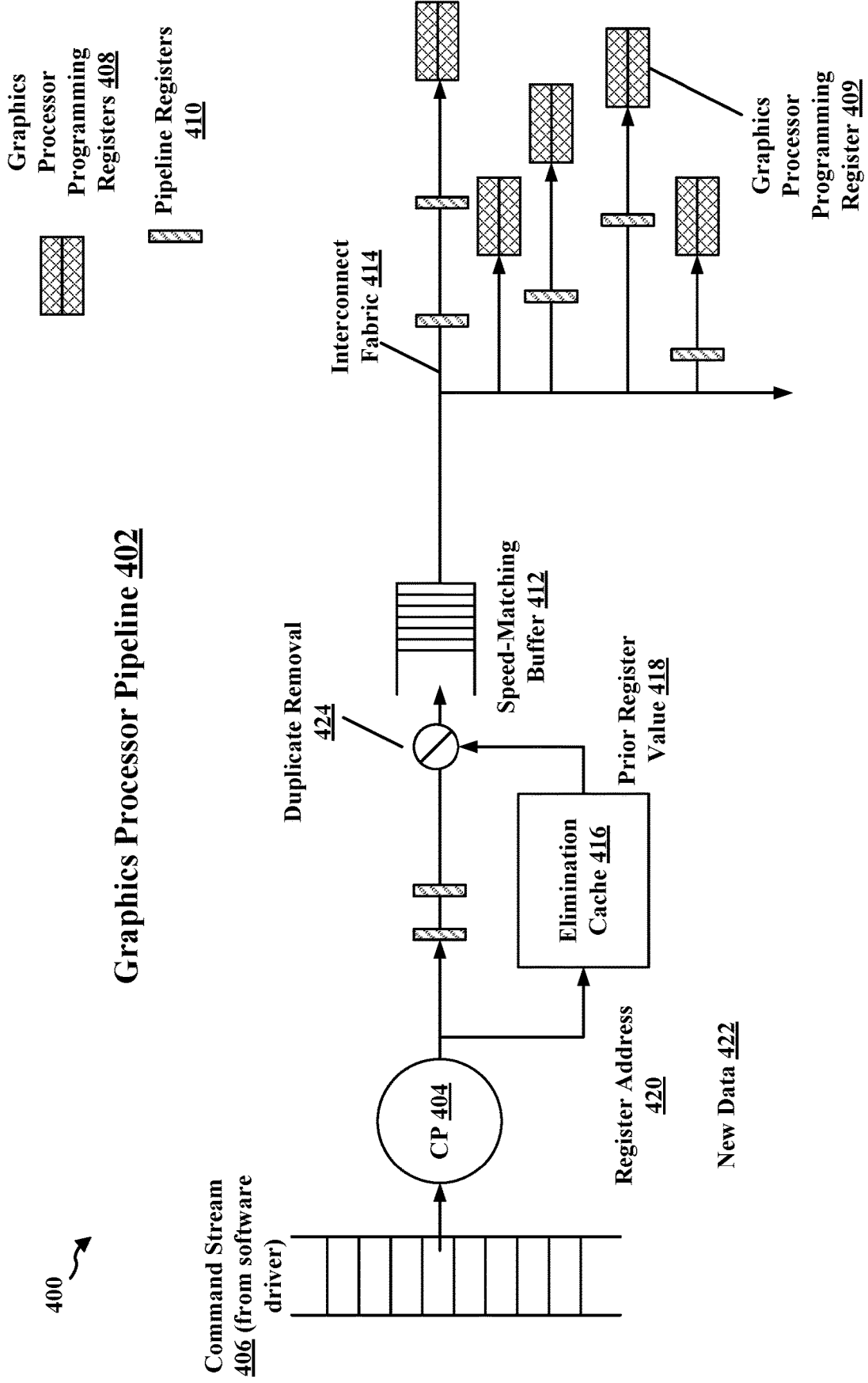
FIG. 4 is a diagram illustrating an example graphics processor pipeline in accordance with one or more techniques of this disclosure.

FIG. 4 is a diagram 400 illustrating an example graphics processor pipeline 402 in accordance with one or more techniques of this disclosure. In an example, the graphics processor pipeline 402 may be included in the device 104 and/or the GPU 200. The graphics processor pipeline 402 may include a command processor (CP) 404 that may receive a command stream 406 generated by a software driver (e.g., a software driver associated with the device 104, such as a user mode driver). In general, the CP 404 may execute and interpret commands from the software driver. For instance, the CP 404 may convert the commands into register programming updates (i.e., the CP 404 may generate a list of register updates). Although FIG. 4 depicts a single CP, the graphics processor pipeline 402 may include multiple CPs. The command stream 406 may include state updates that prepare a GPU for upcoming draw commands used to display graphical content on a display (e.g., the display(s) 131) as well as the draw commands. The state updates may include data associated with the upcoming draw commands and register addresses for registers that are to be populated with the data. In an example, a state update may include an 18-bit register address and a 32-bit value (i.e., a 32-bit data value).

The graphics processor pipeline 402 may include graphics processor programming registers 408 and pipeline registers 410. In general, a register may include a relatively small amount of relatively quickly accessible storage. The graphics processor programming registers 408 may store states used for draw commands. For instance, the graphics processor programming registers 408 may store data (e.g., values) used for draw commands performed by a graphics processor. In an example, a graphics processor programming register 409 may store data (e.g., a value) for a draw command, where the data originates from the command stream 406 and where the CP 404 causes the data to be stored in the graphics processor programming register 409. The graphics processor programming registers 408 may also be referred to as context registers. The pipeline registers 410 may store data as the data flows to the graphics processor programming registers 408 in order to accommodate a physical distance between the CP 404 and the graphics processor programming registers 408. For instance, the pipeline registers 410 may be utilized when a delay associated with a wire approaches a period of a clock that is used to send data over the wire.

The graphics processor pipeline 402 may include a speed-matching buffer 412. The speed-matching buffer 412 may match a speed of the CP 404 to a speed at which a graphics processor executes draw commands. The graphics processor pipeline 402 may include an interconnect fabric 414. The interconnect fabric 414 may support an efficient connection of processors, on-chip memories, and off-chip external memory interfaces. For instance, the interconnect fabric 414 may facilitate connections of the graphics processor programming registers 408 and the pipeline registers 410 to other portions of the graphics processor pipeline 402.

The graphics processor pipeline 402 may include an elimination cache 416. The elimination cache 416 may be a hardware cache. In an example, the elimination cache 416 may be or include an associative cache, a direct-mapped cache, or a set-associative mapped cache. The elimination cache 416 may be configured to store state updates from the command stream 406. More specifically, the elimination cache 416 may be configured to store state updates for registers (e.g., the graphics processor programming registers 408). In one example, the elimination cache 416 may store a list of states that are most recently updated from the command stream 406 up to a threshold number (e.g., the last ten states that have been updated, the last hundred states that have been updated, the last thousand states that have been updated, etc.). A state that has been least recently updated may be removed from the elimination cache 416 when the threshold number of states stored in the elimination cache 416 will be exceeded in order to make space for a new state update that is to be stored in the elimination cache 416. In another example, the elimination cache 416 may store a list of states that are most frequently updated up to a threshold number (e.g., the ten most frequently updated states, the hundred most frequently updated states, the thousand most frequently updated states, etc.). A state that has been least frequently updated may be removed from the elimination cache 416 when the threshold number of states stored in the elimination cache 416 will be exceeded in order to make space for a new state update that is to be stored in the elimination cache 416. In yet another example, the elimination cache 416 may have a state space equal to a state space of a graphics processor, and as a result, the elimination cache 416 may store state updates for each register of the graphics processor. A state space may refer to a total amount of space that can be held in a graphics processor or a component thereof, that is, state space may refer to a total number of registers that may be programmed. When a state update is stored in the elimination cache 416, the state update may be referred to as "a state."

In an example, the elimination cache 416 may store a register value (referred to in FIG. 4 as "a prior register value 418") for the graphics processor programming register 409, where the prior register value 418 may be associated with an address for the graphics processor programming register 409 in the elimination cache 416. The CP 404 may transmit a register address 420 and new data 422 (collectively, "a state update") to hardware and/or software logic associated with the elimination cache 416, where the register address 420 corresponds to the graphics processor programming register 409. A register address may be an identifier of a component that holds a state. In an example, the new data 422 may be identical to the prior register value 418, that is, a value of the new data 422 may be identical to the prior register value 418. The hardware and/or software logic may perform a lookup with respect to the elimination cache 416 using the register address 420 (for the graphics processor programming register 409) to obtain the prior register value 418 (for the graphics processor programming register 409). The hardware and/or software logic may determine that the new data 422 is identical to the prior register value 418, that is, a value of the new data 422 may be identical to the prior register value 418. As a result, the register address 420 and the new data 422 may be a redundant state update. Based on the determination, at 424 the hardware and/or software logic may prevent the new data 422 from being written to the graphics processor programming register 409 (i.e., duplicate removal), as the new data 422 is associated with a redundant state update. As a result, the elimination cache 416 may reduce power consumption and reduce utilization of computational resources within the graphics processor pipeline 402 by preventing the redundant state update from being written to the graphics processor programming register 409.

Figure 5:
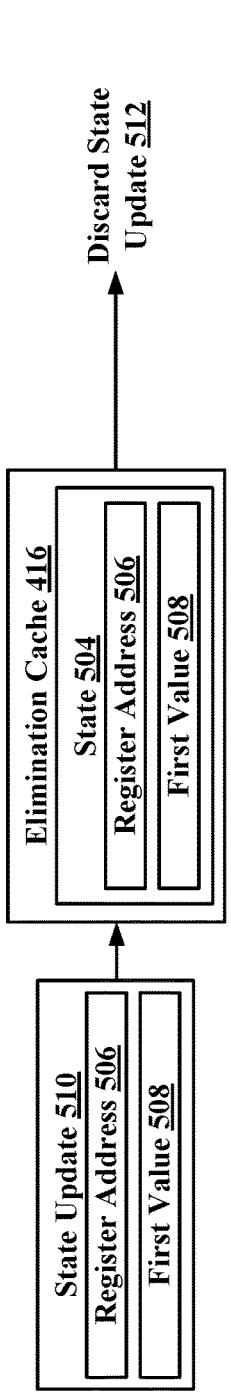
FIG. 5 is a diagram illustrating examples of discarding and not discarding a state update in accordance with one or more techniques of this disclosure.
Figure 5:
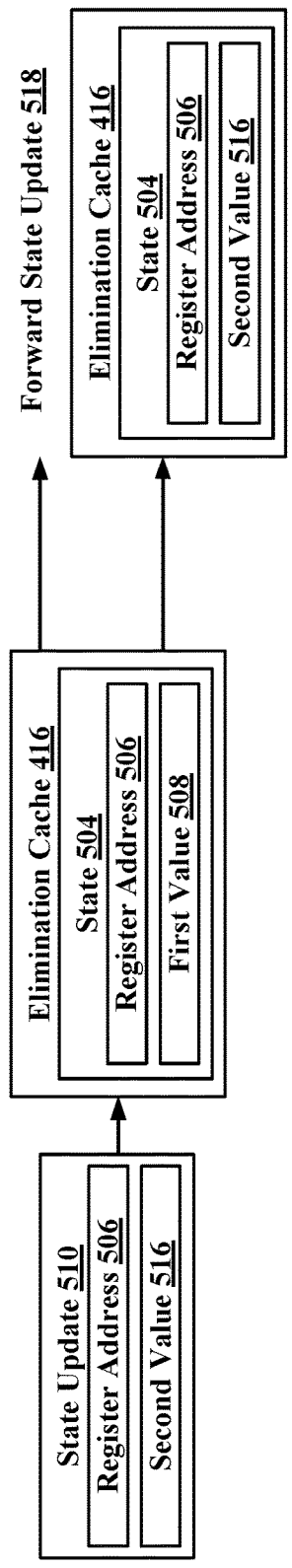
Figure 5:
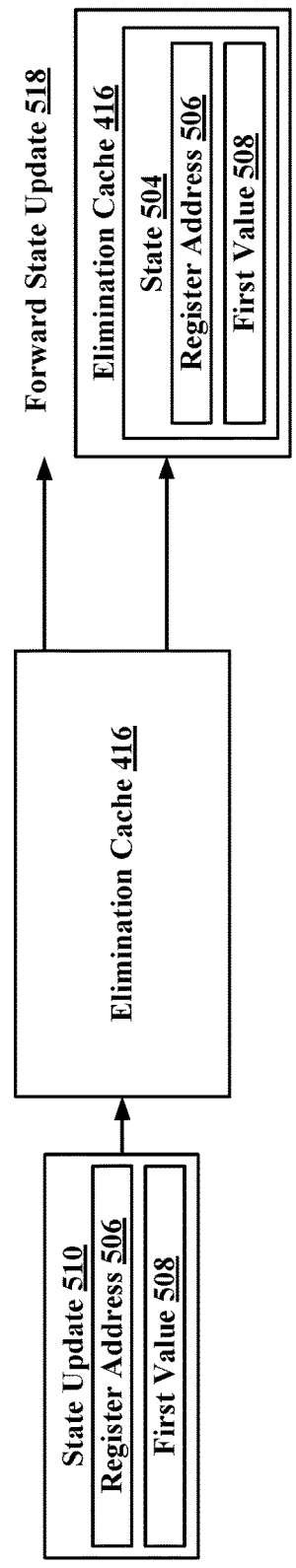

FIG. 5 is a diagram 500 illustrating examples of discarding and not discarding a state update in accordance with one or more techniques of this disclosure. In a first example 502, the elimination cache 416 may store a state 504 corresponding to a register (e.g., the graphics processor programming register 409). The state 504 may include a register address 506 for a register (e.g., for the graphics processor programming register 409) and a first value 508 stored in the register. Hardware and/or software logic associated with the elimination cache 416 may obtain a state update 510, where the state update 510 includes the register address 506 and the first value 508. The hardware and/or software logic may look up the first value 508 in the elimination cache 416 using the register address 506 in the state update 510. The hardware and/or software logic may determine that the first value 508 in the state update 510 is equal to the first value 508 in the state 504 stored in the elimination cache 416, that is, the hardware and/or software logic may determine that the state update 510 is redundant. Based on the determination, at 512, the hardware and/or software logic may discard the state update 510. For instance, the hardware and/or software logic may prevent (i.e., stop) the first value 508 in the state update 510 from being written to the register (e.g., the graphics processor programming register 409).

In a second example 514, the elimination cache 416 may store the state 504 as in the first example 502 described above. However, in the second example 514, the state update 510 may include a second value 516 in place of the first value 508, where the second value 516 is different from the first value 508. The hardware and/or software logic associated with the elimination cache 416 may obtain the state update 510. The hardware and/or software logic may look up the first value 508 in the elimination cache 416 using the register address 506 in the state update 510. The hardware and/or software logic may determine that the second value 516 in the state update 510 is not equal to the first value 508 in the state 504 stored in the elimination cache 416, that is, the hardware and/or software logic may determine that the state update 510 is not redundant. Based on the determination, at 518, the hardware and/or software logic may forward the state update 510 such that the second value 516 is written to a register (e.g., the graphics processor programming register 409). Furthermore, based on the determination, the hardware and/or software logic may store the second value 516 as part of the state 504 in the elimination cache 416.

In a third example 520, the elimination cache 416 may not store the state 504 as in the first example. The hardware and/or software logic associated with the elimination cache 416 may obtain the state update 510, where the state update 510 includes the register address 506 and the first value 508 as described above in the first example 502. The hardware and/or software logic may determine that a state corresponding to the state update is not present in the elimination cache 416 using the register address in the state update 510. Based on the determination, at 518, the hardware and/or software logic may forward the state update 510 such that the first value 508 is written to a register (e.g., the graphics processor programming register 409). Furthermore, based on the determination, the hardware and/or software logic may store the first value 508 as part of the state 504 in the elimination cache 416.

Figure 6:
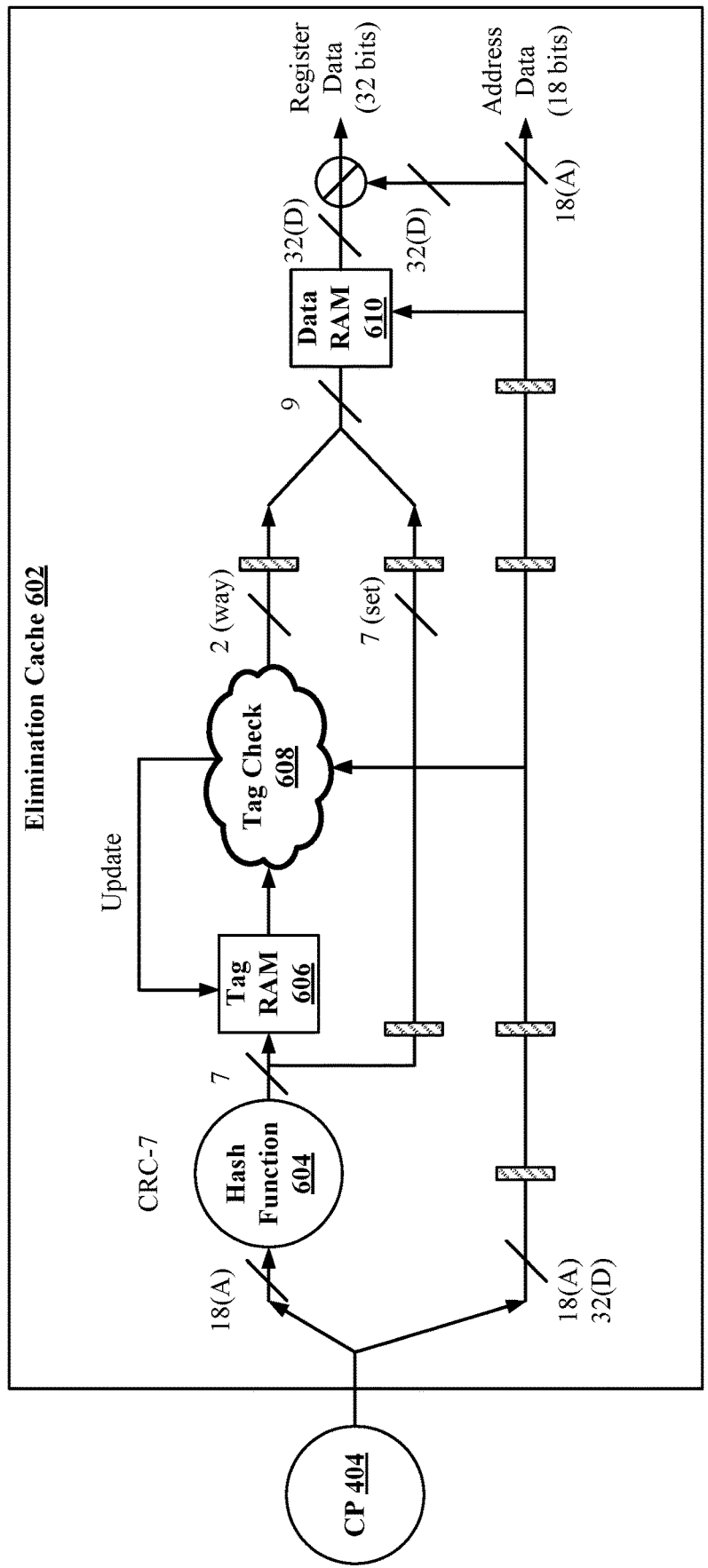
FIG. 6 is a diagram illustrating an example elimination cache in accordance with one or more techniques of this disclosure.

FIG. 6 is a diagram 600 illustrating an example elimination cache 602 in accordance with one or more techniques of this disclosure. In an example, the elimination cache 602 may be or include the elimination cache 416. The elimination cache 602 may be a 512 entry cache that is organized into 128 sets×4 ways, that is the elimination cache 602 may store 512 entries for registers that are organized into 128 sets, where each set has 4 ways. The elimination cache 602 may include pipeline registers 410 (described above in the description of FIG. 4).

The CP 404 may generate a state update that includes an 18-bit address (18(A)) for a register (e.g., the graphics processor programming register 409) and a 32-bit data value (32(D)) that may or may not be stored in the register depending upon whether the 32-bit data value is not or is stored in the elimination cache 602. The 18-bit address may support up to $2^{18}$ registers.

Hardware and/or software logic associated with the elimination cache 602 may apply a hash function 604 to the 18-bit address. The hash function 604 may map the 18-bit address to a fixed-size value, where the fixed-size value may be referred to as "a hash value," "a hash code," "a digest," or a "hash." The hash function 604 may randomize incoming register addresses such that the incoming register addresses may be (approximately) evenly distributed across the 128 sets of the elimination cache 602. In an example, the hash function 604 may be a cyclic redundancy check 7 (CRC-7) hash function; however, other types of hash functions may be utilized. When the hash function 604 is a CRC-7 hash function, the output of the hash function 604 is a 7-bit set index that may address the 128 sets of the elimination cache 602. The hardware and/or software logic may provide the output of the hash function (7) to Tag RAM 606 of the elimination cache 602. The Tag RAM 606 may be a specialized bank of static RAM used to hold addresses.

In one aspect, a simulation of a set of hash functions may be performed. In an example, the set of hash functions may include the hash function 604. The hash function 604 may be selected based on the simulation of the set of hash functions. For example, a graphics benchmark (e.g., a computer game) may be run, where programming of registers associated with the graphics benchmark are available in a database. The programming of the registers may be referred to as a "vector" for the graphics benchmark. The vector may be run on a graphics processor that does not include an elimination cache and statistics may be collected for register programming. A first hash function (e.g., H1) may be selected and the vector may be run on a graphics processor that includes an elimination cache that utilizes the first hash function. Statistics may be collected for register programming of the graphics processor that includes the elimination cache that utilizes the first hash function. A second hash function (e.g., H2) may be selected and the vector may be run on a graphics processor that includes an elimination cache that utilizes the second hash function. Statistics may be collected for register programming of the graphics processor that includes the elimination cache that utilizes the second hash function. Statistics may be compared across many simulations (e.g., a simulation associated the first hash function, a simulation associated with the second hash function, etc.) and a hash function may be selected based on a metric. For example, the hash function may be selected that is associated with a fewest number of registers programmed, a highest number of redundant state updates being eliminated, etc.

The hardware and/or software logic may perform a Tag check 608 using the 18-bit address. The Tag check 608 may check if the 18-bit address exists in any one of the 4 ways of the elimination cache 602. For instance, the Tag RAM 606 may contain up to four different full addresses, and the Tag check 608 may determine if the 18-bit address matches any one of the four different full addresses. The Tag RAM 606 may be associated with a replacement algorithm (which may also be referred to as an update algorithm), such as a least recently used (LRU) algorithm or a least frequently used (LFU) algorithm that may be utilized to update the Tag RAM 606. In an example, if the Tag check 608 hits a register (i.e., the register indicated by the CP 404 is already in the elimination cache 602), the replacement algorithm may update a tag in the Tag RAM 606. For instance, the replacement algorithm may update an LRU state to indicate that the register is a most recently observed register update. In another example, if the Tag check 608 does not hit a register (i.e., the register indicated by the CP 404 is not in the elimination cache 602), the replacement algorithm may evict another register in the Tag RAM 606 in order to make space for an entry for the register.

The Tag check 608 may select one of the four ways of the elimination cache 602 and generate a 2-bit address (2(way)) for the way. The 2-bit address may be combined with the 7-bit set address (7(set)) to create a 9-bit index (9) that may be stored in data RAM 610. In an example, the data RAM 610 may store 512 entries. The data RAM 610 may contain a 32-bit value for each of the 512 entries in the elimination cache 602. A most recent value for the register may be read from the data RAM 610. The most recent value for the register may be compared to the 32-bit data value (32(D)) from the CP 404. If the most recent value for the register is equal to the 32-bit data value (32(D)) from the CP 404, the 32-bit data value (32(D)) from the CP 404 may be discarded, as the 32-bit data value (32(D)) is redundant. The 32-bit data value (32(D)) from the CP 404 may be written to the data RAM 610.

In contrast to other types of caches (e.g., a CPU cache), the elimination cache 602 may be a one-way cache in which data flows in a single direction (i.e., a pipelined cache). For instance, in a CPU cache, an address may be "pushed" into the CPU cache and a data value may be read back from the CPU cache. Latency may be a factor in performance of a CPU cache; however, in the elimination cache 602, latency may not be a factor in performance of the elimination cache 602, as data flows in a single direction; however, throughput may be a factor in the elimination cache 602.

Figure 7:
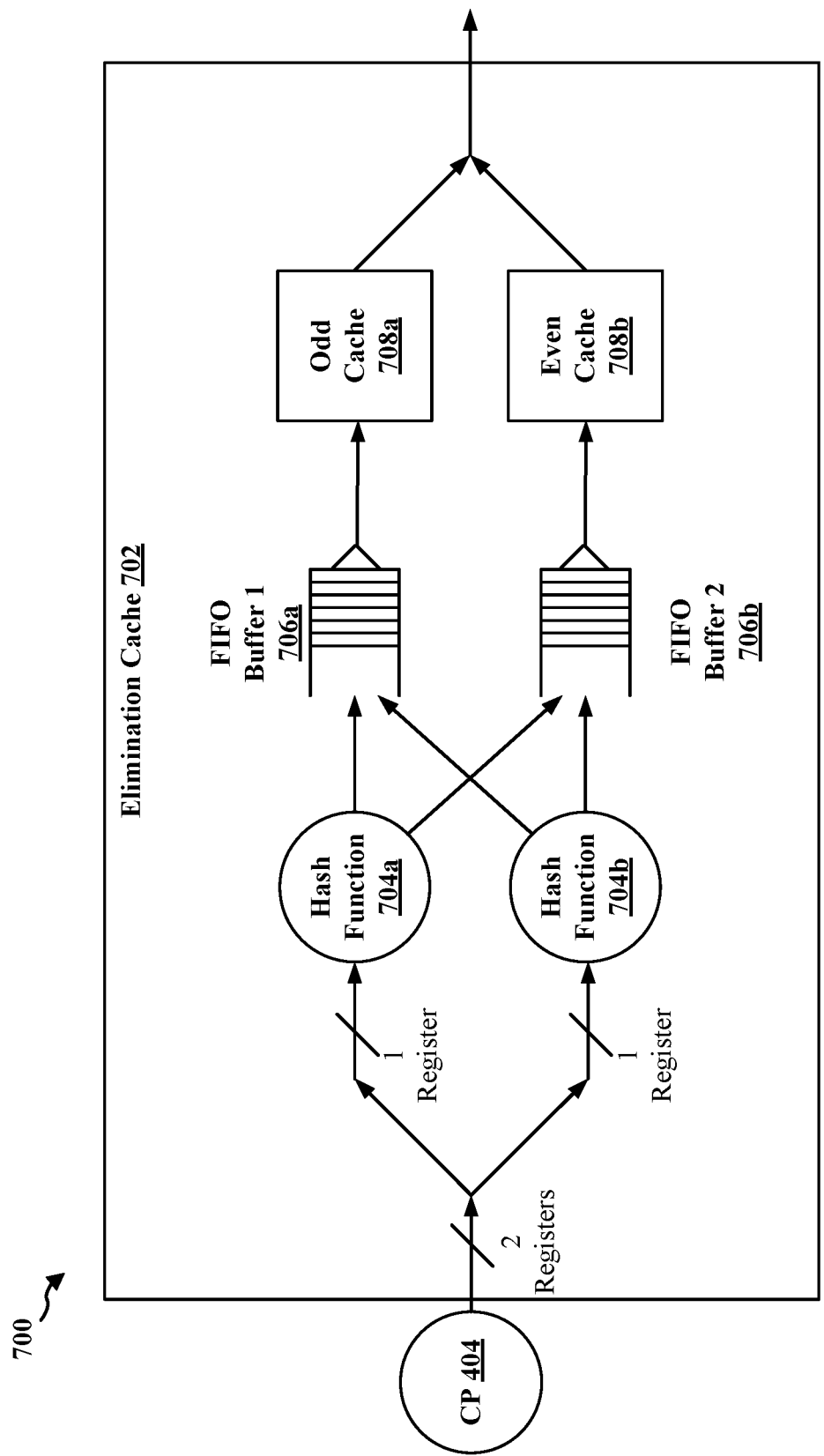
FIG. 7 is a diagram illustrating an example elimination cache including two parallel caches in accordance with one or more techniques of this disclosure.

FIG. 7 is a diagram 700 illustrating an example elimination cache 702 including two parallel caches in accordance with one or more techniques of this disclosure. A parallel cache may refer to two or more caches operating concurrently on independent sets of values in order to provide a greater amount of throughput in comparison to a non-parallel cache (i.e., a single cache). For instance, a parallel cache may perform more operations (e.g., compare operations and discard operations) per second compared to a non-parallel cache (i.e., a single cache). In an example, the elimination cache 702 may be or include the elimination cache 416. The elimination cache 702 may be associated with a higher throughput than other types of caches, such as the elimination cache 602. For example, the elimination cache 702 may support a higher programming rate than the elimination cache 602. In an example, the elimination cache 702 may support two updates (e.g., two state updates) per clock cycle while the elimination cache 602 may support one update (e.g., one state update) per clock cycle.

In an example, the CP 404 may generate a state update for a first register (1 register) and a state update for a second register (1 register). Hardware and/or software logic associated with the elimination cache 702 may execute a first instance of a hash function 704a on the state update for the first register and a second instance of the hash function 704b on the state update for the second register. In an example, the first instance of the hash function 704a and the second instance of the hash function 704b may both be CRC-7 hash functions. The hardware and/or software logic may determine whether the output (i.e., an index) of the first instance of the hash function 704a is even or odd (e.g., by performing a modulo 2 operation) and the hardware and/or software logic may determine whether the output (i.e., an index) of the second instance of the hash function 704b is even or odd (e.g., by performing a modulo 2 operation). Odd outputs of the first instance of the hash function 704a and odd outputs of the second instance of the hash function 704b may be placed in a first first in, first out (FIFO) buffer 706a. Even outputs of the first instance of the hash function 704a and even outputs of the second instance of the hash function 704b may be placed in a second FIFO buffer 706b. A FIFO buffer may refer to a buffer in which an oldest (e.g., first) entry is processed first. In an example, the first instance of the hash function 704a and the second instance of the hash function 704b may output an approximately equal number of even indices and odd indices. The first FIFO buffer 706a may accommodate a burst of state updates that are each even and the second FIFO buffer 706b may accommodate a burst of state updates that are each odd.

The state update for the first register may be processed in an odd cache 708a in a manner similar to that described above in the description of FIGS. 4-6. The state update for the second register may be processed in an even cache 708b in a manner similar to that described above in the description of FIGS. 4-6. Although the elimination cache 702 is described above as including two hash functions, two FIFO buffers, and two caches, the elimination cache 702 may be extended to more than two hash functions, more than two FIFO buffers, and more than two caches vis-à-vis a modulo n operation, where n is a positive integer greater than two.

Figure 8:
FIG. 8 is a diagram illustrating further example aspects of an elimination cache in accordance with one or more techniques of this disclosure.
Figure 8:
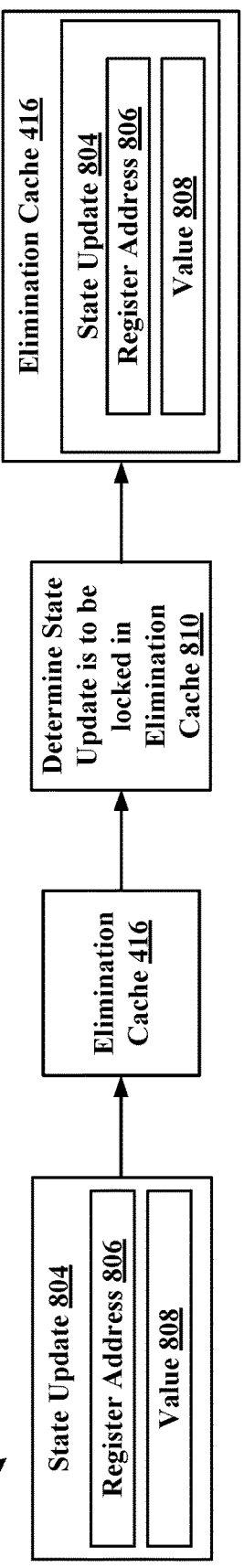
Figure 8:
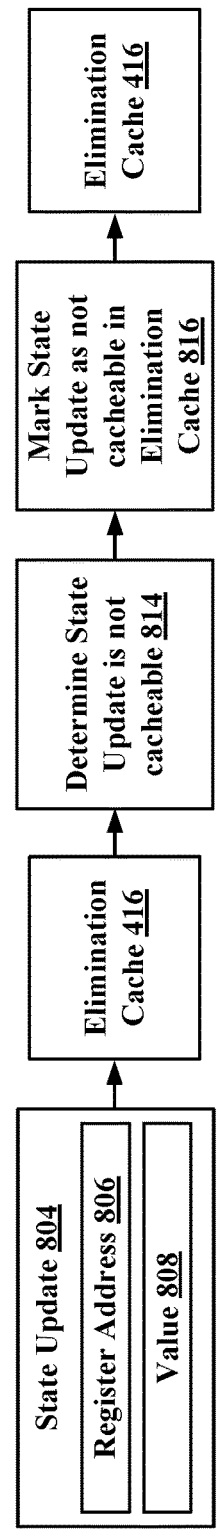
Figure 8:
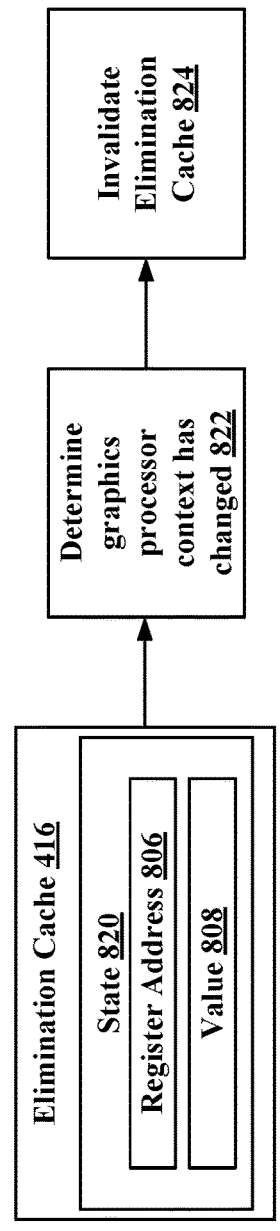

FIG. 8 is a diagram 800 illustrating further example aspects of an elimination cache in accordance with one or more techniques of this disclosure. In a first example 802, register address 806 of a state update 804 may be locked into the elimination cache 416 such that the register address 806 of the state update 804 is not removed from the elimination cache 416 even when conditions occur that may otherwise cause state updates to be removed from the elimination cache 416 (e.g., when a storage capacity of the elimination cache 416 is reached and when the state update 804 is a least frequently used entry of the elimination cache 416). The register address 806 may be locked into the elimination cache 416 due to a corresponding graphics processor register undergoing frequent updates (e.g., as observed in benchmark simulations). For instance, certain redundant state updates may be more computationally expensive than other types of state updates (e.g., due to side effects caused by a register being updated). For example, a shader based register may include a base address of a shader in a shader processor. Updating the shader based register with a state update may cause the shader processor to invalidate cache(s) associated with the shader. A cache invalidation may refer to a process whereby entries in a cache (e.g., the elimination cache 416) are removed. If the state update is redundant, computational costs may be incurred. In an example, if a cache is in a shader processor, invalidating the cache may cause the shader processor to re-fetch data from memory, which may reduce performance.

In the first example 802, hardware and/or software logic associated with the elimination cache 416 may obtain a state update 804 that includes a register address 806 for a register (e.g., the graphics processor programming register 409) and a value 808 for the register. In an example, the state update 804 may not be stored in the elimination cache 416 when the hardware logic and/or software logic obtains the state update 804. At 810, the hardware and/or software logic may determine that the register address 806 of the state update 804 is to be locked in the elimination cache 416 (e.g., due to the state update 804 potentially causing a cache invalidate of a remote shader processor cache). The hardware and/or software logic may store the register address 806 of the state update 804 in the elimination cache 416 along with an indication that the register address 806 of the state update 804 is to be locked into the elimination cache 416 in order to avoid the aforementioned computational costs.

In a second example 812, certain registers may be "action registers" that may be associated with beneficial side effects when updated with a value, even when the update is a redundant value. For instance, a register may store a current value. When a new value is written to the register, side effects may occur that may be beneficial, even when the new value is the same as the current value. As a result, such registers may be marked as non-cacheable in order to facilitate the side-effects that occur when an update (redundant or non-redundant) to the register occurs.

In the second example 812, hardware and/or software logic associated with the elimination cache 416 may obtain a state update 804 that includes a register address 806 for a register (e.g., the graphics processor programming register 409) and a value 808 for the register. In an example, the state update 804 may not be stored in the elimination cache 416 when the hardware logic and/or software logic obtains the state update 804. At 814, the hardware and/or software logic may determine that the state update 804 is not cacheable (e.g., due to beneficial side effects associated with updating the register associated with the register address 806). At 816, the hardware and/or software logic may mark the state update 804 as not cacheable in the elimination cache 416, and as a result, the state update 804 is not stored in the elimination cache 416 even though the state update 804 would otherwise be stored (i.e., cached) in the elimination cache 416.

In a third example 818, a context of a graphics processor may change. For instance, if an application switch occurs (e.g., switching from a first application to a second application) on a device that includes the graphics processor, values stored in the elimination cache 416 may no longer be relevant. As a result, a cache invalidation may be performed without performing a cache flush. A cache invalidation may refer to a process whereby entries in the elimination cache 416 are removed. A cache flush may refer to writing contents of the elimination cache 416 into memory.

In the third example 818, the elimination cache 416 may store a state 820, where the state 820 may include the register address 806 and the value 808. At 822, hardware and/or software logic associated with the elimination cache 416 may determine that a graphics processor context (e.g., a GPU context) has changed. For instance, the context change may be due to an application switch. At 824, the hardware and/or software logic may invalidate the elimination cache 416 based on the determination that the graphics processor context has changed.

Figure 9:
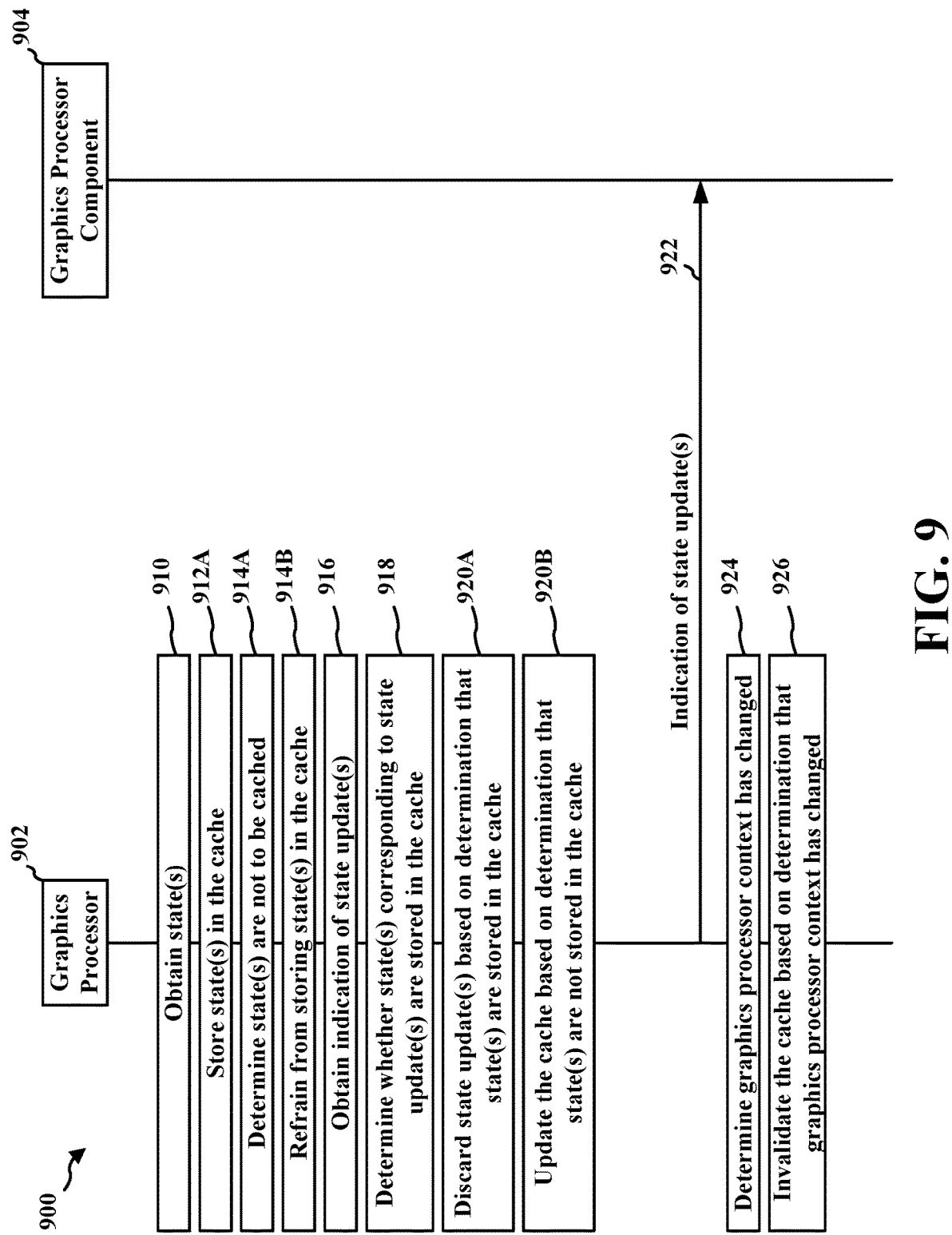
FIG. 9 is a call flow diagram illustrating example communications between a graphics processor and a graphics processor component in accordance with one or more techniques of this disclosure.

FIG. 9 is a call flow diagram 900 illustrating example communications between a graphics processor 902 (e.g., a GPU) and a graphics processor component 904 in accordance with one or more techniques of this disclosure. In an example, the graphics processor 902 may be or include the GPU 200. In another example, the graphics processor 902 may include the graphics processor pipeline 402. In a further example, the graphics processor 902 may include hardware and/or software logic associated with the elimination cache 416. In an example, the graphics processor component 904 may be a speed-matching buffer, such as the speed-matching buffer 412.

A simulation of a set of hash functions may be performed offline. A hash function may be selected for use in a cache based on the simulation.

At 910, the graphics processor 902 may obtain state(s). For instance, the state(s) may be associated with draw command(s) and the graphics processor 902 may obtain the state(s) from a command processor. In one aspect, at 912A, the graphics processor 902 may store the state(s) in the cache. For instance, the graphics processor 902 may store the state(s) in the cache based on a number of register updates associated with at least one register being updated a number of times that exceeds (or is equal to) a threshold value (e.g., five, ten, one-hundred, one-thousand, etc.). The threshold value may be selected based on a result of an offline simulation. The threshold value may be selected based on a review of statistics of the offline simulation. The threshold value may be selected based on a number of different registers being programmed a number of times equal to or greater than the threshold value. In one example, the threshold value may be six and there may be twenty registers that are each programmed at least six times during the simulation. In another example, the threshold value may be eight and there may be twelve registers that are programmed at least eight times. The threshold value may be changed in order to select a number of entries for locking in the cache. Entries locked in the cache may correspond to registers which are updated frequently. In an example, the state(s) may or may not be locked in the cache. In one aspect, at 914A, the graphics processor 902 may determine that the state(s) are not to be cached. In such an aspect, at 914B, the graphics processor 902 may refrain from storing the state(s) in the cache.

At 916, the graphics processor 902 may obtain an indication of state update(s), where the state update(s) may correspond to the state(s). At 918, the graphics processor 902 may determine whether state(s) corresponding to the state update(s) are stored in the cache. At 920A, the graphics processor 902 may discard the state update(s) based on a determination that the state(s) are stored in the cache. At 920B, the graphics processor 902 may update the cache based on a determination that the state(s) are not stored in the cache. For instance, the graphics processor 902 may store the state update(s) in the cache based on the determination. At 922, the graphics processor 902 may output an indication of the state update(s) to the graphics processor component 904 if the state(s) are not stored in the cache.

At 924, the graphics processor 902 may determine that a context of the graphics processor 902 has changed. At 926, the graphics processor 902 may invalidate the cache based on the determination that the context of the graphics processor 902 has changed.

Figure 10:
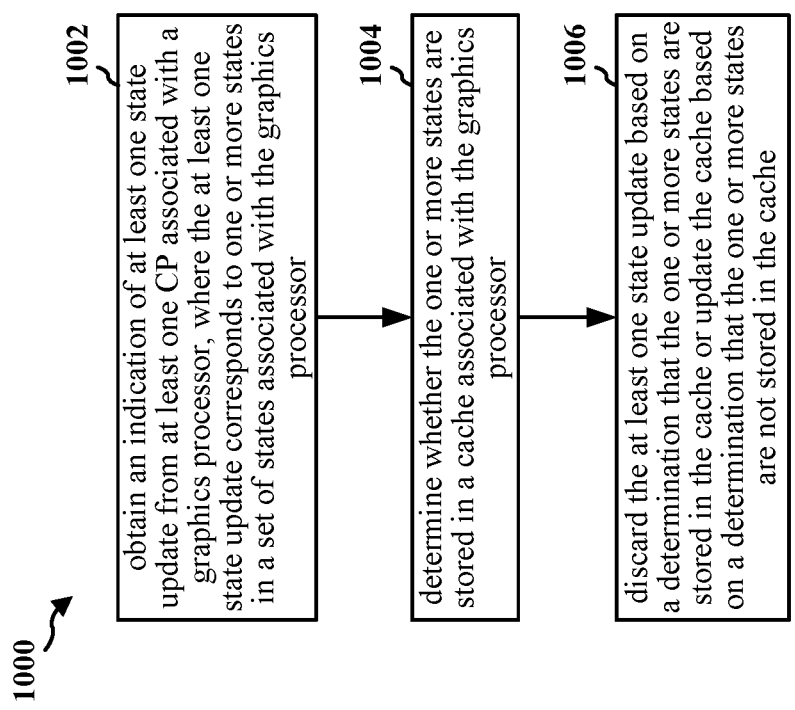
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a graphics processor (e.g., a GPU), a CPU, a wireless communication device, and the like, as used in connection with the aspects of FIGS. 1-9. The method may be associated with various advantages at a graphics processor, such as reducing an amount of redundant state updates, thereby reducing power consumption, reducing programming time, and/or increasing performance in comparison to graphics processors that do not utilize the method. In an example, the method may be performed by the redundant state update reducer 198.

At 1002, the apparatus (e.g., a GPU or a graphics processor) obtains an indication of at least one state update from at least one CP associated with a graphics processor, where the at least one state update corresponds to one or more states in a set of states associated with the graphics processor. For example, FIG. 9 at 916 shows that the graphics processor 902 may obtain an indication of state update(s). In another example, the at least one state update may be the state update 510 and the one or more states may include the state 504. In a further example, the at least one state update may include the register address 420 and the new data 422. In yet another example, the at least one state update may include "18(A)" and "32(D)" as described above in connection with FIG. 6. In a further example, the at least one CP may be or include the CP 404. In an example, 1002 may be performed by the redundant state update reducer 198.

At 1004, the apparatus (e.g., a GPU or a graphics processor) determines whether the one or more states are stored in a cache associated with the graphics processor. For example, FIG. 9 at 918 shows that the graphics processor 902 may determine whether state(s) corresponding to state update(s) are stored in a cache associated with the graphics processor 902. In another example, the cache may be or include the elimination cache 416, the elimination cache 602, and/or the elimination cache 702. In a further example, determining whether the one or more states are stored in the cache associated with the graphics processor may include aspects described above in connection with the first example 502, the second example 514, and/or the third example 520 of FIG. 5. In an example, 1004 may be performed by the redundant state update reducer 198.

At 1006, the apparatus (e.g., a GPU or a graphics processor) discards the at least one state update based on a determination that the one or more states are stored in the cache or updates the cache based on a determination that the one or more states are not stored in the cache. For example, FIG. 9 at 920A shows that the graphics processor 902 may discard state update(s) based on a determination that state(s) are stored in a cache and FIG. 9 at 920B shows that the graphics processor 902 may update the cache based on a determination that the state(s) are not stored in the cache. In a further example, discarding the at least one state update may include aspects described above in connection with the first example 502 of FIG. 5 and updating the cache may include aspects described above in connection with the second example 514 or the third example 520 of FIG. 5. In an example, 1006 may be performed by the redundant state update reducer 198.

Figure 11:
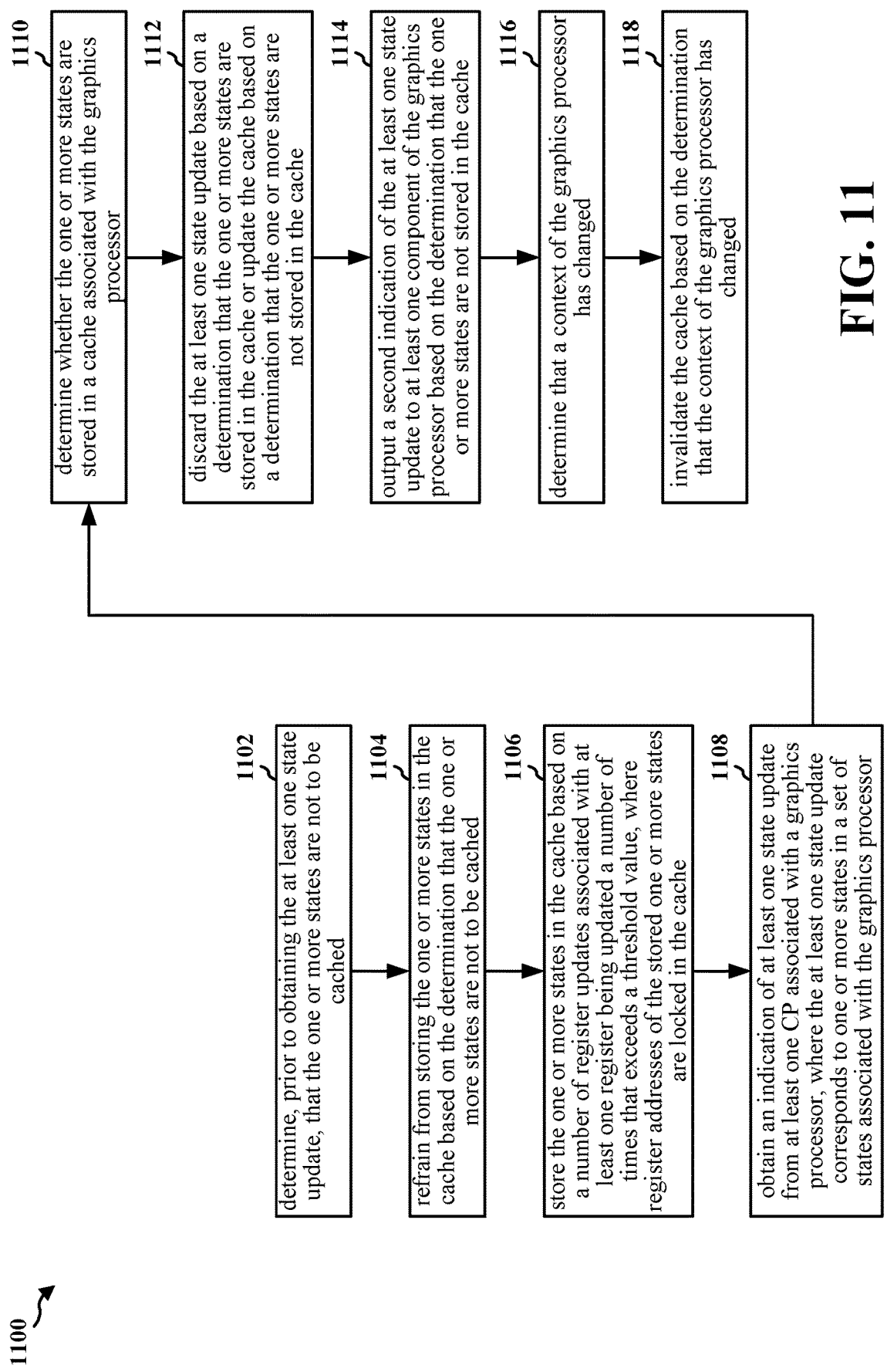
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a graphics processor (e.g., a GPU), a CPU, a wireless communication device, and the like, as used in connection with the aspects of FIGS. 1-9. The method may be associated with various advantages at a graphics processor, such as reducing an amount of redundant state updates, thereby reducing power consumption, reducing programming time, and/or increasing performance in comparison to graphics processors that do not utilize the method. In an example, the method (including the various aspects detailed below) may be performed by the redundant state update reducer 198.

At 1108, the apparatus (e.g., a GPU or a graphics processor) obtains an indication of at least one state update from at least one CP associated with a graphics processor, where the at least one state update corresponds to one or more states in a set of states associated with the graphics processor. For example, FIG. 9 at 916 shows that the graphics processor 902 may obtain an indication of state update(s). In another example, the at least one state update may be the state update 510 and the one or more states may include the state 504. In a further example, the at least one state update may include the register address 420 and the new data 422. In yet another example, the at least one state update may include "18(A)" and "32(D)" as described above in connection with FIG. 6. In a further example, the at least one CP may be or include the CP 404. In an example, 1108 may be performed by the redundant state update reducer 198.

At 1110, the apparatus (e.g., a GPU or a graphics processor) determines whether the one or more states are stored in a cache associated with the graphics processor. For example, FIG. 9 at 918 shows that the graphics processor 902 may determine whether state(s) corresponding to state update(s) are stored in a cache associated with the graphics processor 902. In another example, the cache may be or include the elimination cache 416, the elimination cache 602, and/or the elimination cache 702. In a further example, determining whether the one or more states are stored in the cache associated with the graphics processor may include aspects described above in connection with the first example 502, the second example 514, and/or the third example 520 of FIG. 5. In an example, 1110 may be performed by the redundant state update reducer 198.

At 1112, the apparatus (e.g., a GPU or a graphics processor) discards the at least one state update based on a determination that the one or more states are stored in the cache or updates the cache based on a determination that the one or more states are not stored in the cache. For example, FIG. 9 at 920A shows that the graphics processor 902 may discard state update(s) based on a determination that state(s) are stored in a cache and FIG. 9 at 920B shows that the graphics processor 902 may update the cache based on a determination that the state(s) are not stored in the cache. In a further example, discarding the at least one state update may include aspects described above in connection with the first example 502 of FIG. 5 and updating the cache may include aspects described above in connection with the second example 514 or the third example 520 of FIG. 5. In an example, 1112 may be performed by the redundant state update reducer 198.

In one aspect, at 1114, the apparatus (e.g., a GPU or a graphics processor) may output a second indication of the at least one state update to at least one component of the graphics processor based on the determination that the one or more states are not stored in the cache. For example, FIG. 9 at 922 shows that the graphics processor 902 may output an indication of state update(s) to the graphics processor component 904 based on the determination performed at 918. In a further example, the second example 514 and the third example 520 of FIG. 5 show that the state update 510 may be forwarded at 518. In an example, 1114 may be performed by the redundant state update reducer 198.

In one aspect, the at least one component of the graphics processor may include a speed-matching buffer. For example, the at least one component of the graphics processor may be or include the speed-matching buffer 412.

In one aspect, the at least one state update may be associated with a draw command for the graphics processor. For example, the state update 510 may be associated with a draw command for a graphics processor.

In one aspect, a first size of the cache may be less than or equal to a second size of a state space of the graphics processor. For example, a size of the elimination cache 416, the elimination cache 602, and/or the elimination cache 702 may be less than or equal to a size of a state space of the GPU 200.

In one aspect, at 1106, the apparatus (e.g., a GPU or a graphics processor) may store the one or more states in the cache based on a number of register updates associated with at least one register being updated a number of times that exceeds a threshold value, where register addresses of the stored one or more states may be locked in the cache. For example, FIG. 9 at 912A shows that state(s) may be stored in a cache, and storing the states in the cache may be based on a number of register updates associated with register(s) being updated a number of times that exceeds a threshold value. In another example, locking the register addresses of the stored one or more states in the cache may include aspects described above in connection with the first example 802 of FIG. 8. In another example, the at least one register may be or include the graphics processor programming register 409. In an example, 1106 may be performed by the redundant state update reducer 198.

In one aspect, the one or more states may include a most-recently updated state in the set of states associated with the graphics processor. For example, the state 504 may be a most-recently updated state in a set of states associated with a graphics processor.

In one aspect, obtaining the indication of the at least one state update may include obtaining a command stream including the at least one state update that is output by the CP. For example, obtaining the indication of the state update(s) at 916 may include obtaining a command stream including the state update(s) that is output by a CP. In another example, the CP may be or include the CP 404 and the command stream may be or include the command stream 406.

In one aspect, the command stream may be associated with a software driver of the graphics processor. For example, FIG. 4 shows that the command stream 406 may be associated with a software driver of a graphics processor.

In one aspect, the cache may be an elimination cache, and the elimination cache may be associated with storage of a plurality of states including the one or more states in the set of states for the at least one state update. For example, the cache may be the elimination cache 416, the elimination cache 602, and/or the elimination cache 702 and the elimination cache 416, the elimination cache 602, and/or the elimination cache 702 may be associated with storage of a plurality of states including the one or more states in the set of states for the at least one state update In one aspect, the elimination cache may be associated with at least one hash function, and the at least one hash function may be associated with a simulation of a set of hash functions including the at least one hash function. For example, hash functions described herein may be associated with a simulation of a set of hash functions including the at least one hash function.

In one aspect, the determination that the one or more states are stored in the cache may be associated with the at least one hash function. For example, the determination performed at 918 may be associated with the hash function.

In one aspect, the at least one state update may be a redundant state update if the one or more states are stored in the cache. For example, the first example 502 of FIG. 5 shows that the state update 510 may be redundant if the state 504 is stored in the elimination cache 416.

In one aspect, the at least one state update may be associated with register data and a register address. For example, the register data may be or include the new data 422 and the register address may be or include the register address 420. In another example, the register data may be or include the first value 508 and/or the second value 516 and the register address may be or include the register address 506. In yet another example, the register data may be or include "32(D)" depicted in FIG. 6 and the register address may be or include "18(A)" depicted in FIG. 6.

In one aspect, at 1116, the apparatus (e.g., a GPU or a graphics processor) may determine that a context of the graphics processor has changed. For example, FIG. 9 at 924 shows that the graphics processor 902 may determine that a graphics processor context has changed. In a further example, determining that the context of the graphics processor has changed may include aspects described above in connection with the third example 818 of FIG. 8. In an example, 1116 may be performed by the redundant state update reducer 198.

In one aspect, at 1118, the apparatus (e.g., a GPU or a graphics processor) may invalidate the cache based on the determination that the context of the graphics processor has changed. For example, FIG. 9 at 926 shows that the graphics processor 902 may invalidate the cache based on the determination at 924 that the graphics processor context has changed. In a further example, invalidating the cache may include aspects described above in connection with the third example 818 of FIG. 8. In an example, 1118 may be performed by the redundant state update reducer 198.

In one aspect, the cache may include a plurality of parallel caches. For example, the cache may be or include the elimination cache 702 and the plurality of parallel caches may be or include the odd cache 708a and the even cache 708b.

In one aspect, at 1102, the apparatus (e.g., a GPU or a graphics processor) may determine, prior to obtaining the indication of the at least one state update, that the one or more states are not to be cached. For example, FIG. 9 at 914A shows that the graphics processor 902 may determine that the state(s) are not to be cached prior to obtaining the indication of the state update(s) at 916. In a further example, determining that the one or more states are not to be cached may include aspects described above in connection with the second example 812 of FIG. 8. In an example, 1102 may be performed by the redundant state update reducer 198.

In one aspect, at 1104, the apparatus (e.g., a GPU or a graphics processor) may refrain from storing the one or more states in the cache based on the determination that the one or more states are not to be cached. For example, FIG. 9 at 914B shows that the graphics processor 902 may refrain from storing the state(s) in the cache based on the determination performed at 914A. In a further example, failing to store the one or more states in the cache may include aspects described above in connection with the second example 812 of FIG. 8. In an example, 1104 may be performed by the redundant state update reducer 198.

In configurations, a method or an apparatus for graphics processing is provided. The apparatus may be a graphics processor (e.g., a GPU), a CPU, or some other processor that may perform graphics processing. In aspects, the apparatus may be the processing unit 120 within the device 104, or may be some other hardware within the device 104 or another device. The apparatus may include means for obtaining an indication of at least one state update from at least one CP associated with a graphics processor, where the at least one state update corresponds to one or more states in a set of states associated with the graphics processor. The apparatus may further include means for determining whether the one or more states are stored in a cache associated with the graphics processor. The apparatus may further include means for discarding the at least one state update based on the determination that the one or more states are stored in the cache or updating the cache based on the determination that the one or more states are not stored in the cache. The apparatus may further include means for outputting a second indication of the at least one state update to at least one component of the graphics processor based on the determination that the one or more states are not stored in the cache. The apparatus may further include means for storing the one or more states in the cache based on a number of register updates associated with at least one register being updated a number of times that exceeds a threshold value, where register addresses of the stored one or more states are locked in the cache. The means for obtaining the indication of the at least one state update may include means for obtaining a command stream including the at least one state update that is output by the CP. The apparatus may further include means for performing a simulation of a set of hash functions including the at least one hash function. The apparatus may further include means for selecting the at least one hash function based on the simulation of the set of hash functions. The apparatus may further include means for determining that a context of the graphics processor has changed. The apparatus may further include means for invalidating the cache based on the determination that the context of the graphics processor has changed. The apparatus may further include means for determining, prior to obtaining the indication of the at least one state update, that the one or more states are not to be cached. The apparatus may further include means for failing to store the one or more states in the cache based on the determination that the one or more states are not to be cached.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: obtaining an indication of at least one state update from at least one command processor (CP) associated with a graphics processor, where the at least one state update corresponds to one or more states in a set of states associated with the graphics processor; determining whether the one or more states are stored in a cache associated with the graphics processor; and discarding the at least one state update based on the determination that the one or more states are stored in the cache or updating the cache based on the determination that the one or more states are not stored in the cache.

Aspect 2 may be combined with aspect 1 and further includes outputting a second indication of the at least one state update to at least one component of the graphics processor based on the determination that the one or more states are not stored in the cache.

Aspect 3 may be combined with aspect 2 and includes that the at least one component of the graphics processor includes a speed-matching buffer.

Aspect 4 may be combined with any of aspects 1-3 and includes that the at least one state update is associated with a draw command for the graphics processor.

Aspect 5 may be combined with any of aspects 1-4 and includes that a first size of the cache is less than or equal to a second size of a state space of the graphics processor.

Aspect 6 may be combined with any of aspects 1-5 and further includes storing the one or more states in the cache based on a number of register updates associated with at least one register being updated a number of times that exceeds a threshold value, where register addresses of the stored one or more states are locked in the cache.

Aspect 7 may be combined with any of aspects 1-6 and includes that the one or more states include a most-recently updated state in the set of states associated with the graphics processor.

Aspect 8 may be combined with any of aspects 1-7 and includes that obtaining the indication of the at least one state update includes obtaining a command stream including the at least one state update that is output by the CP.

Aspect 9 may be combined with aspect 8 and includes that the command stream is associated with a software driver of the graphics processor.

Aspect 10 may be combined with any of aspects 1-9 and includes that the cache is an elimination cache, where the elimination cache is associated with storage of a plurality of states including the one or more states in the set of states for the at least one state update.

Aspect 11 may be combined with aspect 10 and includes that the elimination cache is associated with at least one hash function, and the at least one hash function is associated with a simulation of a set of hash functions including the at least one hash function.

Aspect 12 may be combined with aspect 11 and includes that the determination that the one or more states are stored in the cache is associated with the at least one hash function.

Aspect 13 may be combined with any of aspects 1-12 and includes that the at least one state update is a redundant state update if the one or more states are stored in the cache.

Aspect 14 may be combined with any of aspects 1-13 and includes that the at least one state update is associated with register data and a register address.

Aspect 15 may be combined with any of aspects 1-14 and further includes determining that a context of the graphics processor has changed; and invalidating the cache based on the determination that the context of the graphics processor has changed.

Aspect 16 may be combined with any of aspects 1-15 and includes that the cache includes a plurality of parallel caches.

Aspect 17 may be combined with any of aspects 1-16 and further includes determining, prior to obtaining the indication of the at least one state update, that the one or more states are not to be cached; and refraining from storing the one or more states in the cache based on the determination that the one or more states are not to be cached.

Aspect 18 is an apparatus for graphics processing including at least one processor coupled to a memory and configured to implement a method as in any of aspects 1-17.

Aspect 19 may be combined with aspect 18 and includes that the apparatus is a wireless communication device including at least one of a transceiver or an antenna coupled to the at least one processor.

Aspect 20 is an apparatus for graphics processing including means for implementing a method as in any of aspects 1-17.

Aspect 21 is a computer-readable medium (e.g., a non-transitory computer-readable medium) storing computer executable code, the computer executable code when executed by at least one processor causes the at least one processor to implement a method as in any of aspects 1-17.

Various aspects have been described herein. These and other aspects are within the scope of the following claims.

What is claimed is:

1. An apparatus for graphics processing, comprising:
   a memory; and
   at least one processor coupled to the memory and, based at least in part on information stored in the memory, the at least one processor is configured to:

obtain an indication of at least one state update from at least one command processor (CP) associated with a graphics processor, wherein the at least one state update corresponds to one or more states in a set of states associated with the graphics processor;

determine whether the one or more states are stored in a cache associated with the graphics processor;

store the one or more states in the cache based on a number of register updates associated with at least one register being updated a number of times that exceeds a threshold value, wherein register addresses of the stored one or more states are locked in the cache; and discard the at least one state update based on a determination that the one or more states are stored in the cache or update the cache based on a determination that the one or more states are not stored in the cache.

2. The apparatus of claim 1, wherein the at least one processor is further configured to:

output a second indication of the at least one state update to at least one component of the graphics processor based on the determination that the one or more states are not stored in the cache.

3. The apparatus of claim 2, wherein the at least one component of the graphics processor comprises a speed-matching buffer, wherein the speed-matching buffer enables a speed of the at least one component to match a speed at which the graphics processor executes draw commands.

4. The apparatus of claim 1, wherein the at least one state update is associated with a draw command for the graphics processor.

5. The apparatus of claim 1, wherein a first size of the cache is less than or equal to a second size of a state space of the graphics processor.

6. The apparatus of claim 1, wherein the one or more states include a most-recently updated state in the set of states associated with the graphics processor.

7. The apparatus of claim 1, wherein to obtain the indication of the at least one state update, the at least one processor is configured to obtain a command stream including the at least one state update that is output by the CP.

8. The apparatus of claim 7, wherein the command stream is associated with a software driver of the graphics processor.

9. The apparatus of claim 1, wherein the cache is an elimination cache, wherein the elimination cache is associated with storage of a plurality of states including the one or more states in the set of states for the at least one state update.

10. The apparatus of claim 9, wherein the elimination cache is associated with at least one hash function, and wherein the at least one hash function is associated with a simulation of a set of hash functions including the at least one hash function.

11. The apparatus of claim 10, wherein the determination that the one or more states are stored in the cache is associated with the at least one hash function.

12. The apparatus of claim 1, wherein the at least one state update is a redundant state update if the one or more states are stored in the cache.

13. The apparatus of claim 1, wherein the at least one state update is associated with register data and a register address.

14. The apparatus of claim 1, wherein the at least one processor is further configured to:

determine that a context of the graphics processor has changed; and invalidate the cache based on the determination that the context of the graphics processor has changed.

15. The apparatus of claim 1, wherein the cache comprises a plurality of parallel caches.

16. The apparatus of claim 1, wherein the apparatus is a wireless communication device comprising at least one of a transceiver or an antenna coupled to the at least one processor.

17. A method of graphics processing, comprising:

obtaining an indication of at least one state update from at least one command processor (CP) associated with a graphics processor, wherein the at least one state update corresponds to one or more states in a set of states associated with the graphics processor;

determining whether the one or more states are stored in a cache associated with the graphics processor;

storing the one or more states in the cache based on a number of register updates associated with at least one register being updated a number of times that exceeds a threshold value, wherein register addresses of the stored one or more states are locked in the cache; and discarding the at least one state update based on a determination that the one or more states are stored in the cache or updating the cache based on a determination that the one or more states are not stored in the cache.

18. The method of claim 17, further comprising:

outputting a second indication of the at least one state update to at least one component of the graphics processor based on the determination that the one or more states are not stored in the cache.

19. The method of claim 18, wherein the at least one component of the graphics processor comprises a speed-matching buffer, wherein the speed-matching buffer enables a speed of the at least one component to match a speed at which the graphics processor executes draw commands.

20. The method of claim 17, wherein the at least one state update is associated with a draw command for the graphics processor.

21. The method of claim 17, wherein a first size of the cache is less than or equal to a second size of a state space of the graphics processor.

22. The method of claim 17, wherein the one or more states include a most-recently updated state in the set of states associated with the graphics processor.

23. The method of claim 17, wherein obtaining the indication of the at least one state update comprises obtaining a command stream including the at least one state update that is output by the CP.

24. The method of claim 23, wherein the command stream is associated with a software driver of the graphics processor.

25. The method of claim 17, wherein the cache is an elimination cache, wherein the elimination cache is associated with storage of a plurality of states including the one or more states in the set of states for the at least one state update.

26. The method of claim 25, wherein the elimination cache is associated with at least one hash function, and wherein the at least one hash function is associated with a simulation of a set of hash functions including the at least one hash function.

27. The method of claim 26, wherein the determination that the one or more states are stored in the cache is associated with the at least one hash function.

28. The method of claim 17, wherein the at least one state update is a redundant state update if the one or more states are stored in the cache.

29. The method of claim 17, further comprising:
   determining that a context of the graphics processor has changed; and
   invalidating the cache based on the determination that the context of the graphics processor has changed.

30. A computer-readable medium storing computer executable code, the computer executable code when executed by at least one processor causes the at least one processor to:
   obtain an indication of at least one state update from at least one command processor (CP) associated with a graphics processor, wherein the at least one state update corresponds to one or more states in a set of states associated with the graphics processor;
   determine whether the one or more states are stored in a cache associated with the graphics processor;
   store the one or more states in the cache based on a number of register updates associated with at least one register being updated a number of times that exceeds a threshold value, wherein register addresses of the stored one or more states are locked in the cache; and
   discard the at least one state update based on a determination that the one or more states are stored in the cache or update the cache based on a determination that the one or more states are not stored in the cache.

\* \* \* \* \*